United States Patent
Iwamoto et al.

(10) Patent No.: US 10,173,683 B2
(45) Date of Patent: Jan. 8, 2019

(54) VEHICLE CONTROL DEVICE AND VEHICLE CONTROL METHOD

(71) Applicant: NISSAN MOTOR CO., LTD., Kanagawa (JP)

(72) Inventors: Tadashi Iwamoto, Kanagawa (JP); Atsushi Tezuka, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 30 days.

(21) Appl. No.: 15/502,057

(22) PCT Filed: Aug. 6, 2014

(86) PCT No.: PCT/JP2014/070740
§ 371 (c)(1),
(2) Date: Feb. 6, 2017

(87) PCT Pub. No.: WO2016/021005
PCT Pub. Date: Feb. 11, 2016

(65) Prior Publication Data
US 2017/0217438 A1 Aug. 3, 2017

(51) Int. Cl.
*B60W 30/18* (2012.01)
*B60W 10/02* (2006.01)
(Continued)

(52) U.S. Cl.
CPC ...... *B60W 30/18072* (2013.01); *B60W 10/02* (2013.01); *B60W 10/04* (2013.01);
(Continued)

(58) Field of Classification Search
CPC .......... B60W 30/18072; B60W 10/02; B60W 10/06; B60W 2030/1809;
(Continued)

(56) References Cited

U.S. PATENT DOCUMENTS

| 1,999,284 A | * | 4/1935 | Colvin | B60K 23/00 |
| | | | | 188/140 R |
| 4,084,672 A | * | 4/1978 | Avins | B60K 23/06 |
| | | | | 192/13 R |

(Continued)

FOREIGN PATENT DOCUMENTS

| JP | 2001107763 A | 4/2001 |
| JP | 2012-172578 A | 9/2012 |

(Continued)

OTHER PUBLICATIONS

International Preliminary Report on Patentability issued in corresponding Application No. PCT/JP2014/070740, dated Feb. 9, 2017 (11 pages).

(Continued)

*Primary Examiner* — Sherry L Estremsky
(74) *Attorney, Agent, or Firm* — Osha Liang LLP

(57) ABSTRACT

A vehicle control device disengages a clutch provided between an engine and a driving wheel at a brake-off and an accelerator-off during traveling of the vehicle, and stops the engine and carries out inertia traveling. The vehicle control device starts the engine by the push-start by engaging the clutch and by transmitting the power of the driving wheel to the engine, if it is determined that a brake pedal has been depressed during the inertia traveling.

6 Claims, 2 Drawing Sheets

(51) Int. Cl.
  *B60W 10/04* (2006.01)
  *B60W 10/06* (2006.01)
  *F16D 48/02* (2006.01)

(52) U.S. Cl.
  CPC ............. *B60W 10/06* (2013.01); *F16D 48/02* (2013.01); *B60W 2030/1809* (2013.01); *B60W 2510/0208* (2013.01); *B60W 2510/06* (2013.01); *B60W 2540/10* (2013.01); *B60W 2540/106* (2013.01); *B60W 2540/12* (2013.01); *B60W 2710/021* (2013.01); *B60W 2710/023* (2013.01); *B60W 2710/06* (2013.01); *Y02T 10/48* (2013.01); *Y02T 10/76* (2013.01)

(58) Field of Classification Search
  CPC ....... B60W 2710/021; B60W 2540/12; B60W 2510/0208; B60W 2510/06; B60W 2710/06; B60W 2540/106; B60W 2540/10; B60W 2710/023; F02N 2200/101; F02N 2200/102; F02N 2300/2002
  See application file for complete search history.

(56) References Cited

U.S. PATENT DOCUMENTS

| | | | | |
|---|---|---|---|---|
| 4,842,113 | A | * | 6/1989 | Lutz ................. B60W 10/06 477/73 |
| 2011/0053735 | A1 | * | 3/2011 | Lewis .................. F02N 5/04 477/99 |
| 2012/0100960 | A1 | * | 4/2012 | Pedlar ................ B60W 10/02 477/171 |
| 2012/0265427 | A1 | * | 10/2012 | Petridis ............. B60W 10/02 701/113 |
| 2013/0190998 | A1 | * | 7/2013 | Polimeno ........... B60W 10/02 701/68 |
| 2015/0274168 | A1 | | 10/2015 | Kuroki et al. |
| 2015/0291165 | A1 | | 10/2015 | Mitsuyasu et al. |
| 2015/0291171 | A1 | | 10/2015 | Kuroki et al. |

FOREIGN PATENT DOCUMENTS

| | | |
|---|---|---|
| JP | 2013-204624 A | 10/2013 |
| WO | 2014/068725 A1 | 5/2014 |
| WO | 2014/068726 A1 | 5/2014 |
| WO | 2014068719 A1 | 5/2014 |

OTHER PUBLICATIONS

International Preliminary Report on Patentability issued in corresponding application No. PCT/JP20141070740 dated Mar. 16, 2015 (7 pages).

\* cited by examiner

VEHICLE CONTROL DEVICE AND VEHICLE CONTROL METHOD

BACKGROUND

Technical Field

The present invention relates to a vehicle control device and a vehicle control method.

Related Art

JP2013-204624A discloses a technology that, if a state of accelerator-off and brake-off is brought about during traveling of a vehicle, a transmission is brought into a neutral state, and the vehicle is made to run with inertia.

SUMMARY OF INVENTION

In order to maximize improvement in fuel efficiency during inertia traveling, it may be desirable that an engine be stopped. If the engine is stopped during an inertia traveling mode in which inertia traveling is carried out, the engine needs to be started when the inertia traveling mode is cancelled. The engine is generally started by using a starter motor, but since the number of engine start times drastically increases in a vehicle with the inertia traveling mode onboard, there is a concern of a drop of durability of the starter motor. Thus, instead of the starter motor, push-start by engaging a clutch of the transmission which has been disengaged and by starting the engine by kinetic energy can be considered, but with this method, a shock is involved when the clutch is engaged, and drivability is deteriorated.

According to one or more embodiments of the present invention, an engine is started by engaging the clutch provided between the engine and a driving wheel while deterioration of drivability is suppressed.

A vehicle control device according to one or more embodiments of the present invention disengages a clutch provided between an engine and a driving wheel at a brake-off and an accelerator-off during traveling of the vehicle, and stops the engine and carries out inertia traveling. In the vehicle control device, if it is determined that a brake pedal has been depressed during the inertia traveling, the engine is started by the push-start by engaging the clutch and by transmitting the power of the driving wheel to the engine.

DETAILED DESCRIPTION

Figure 1:
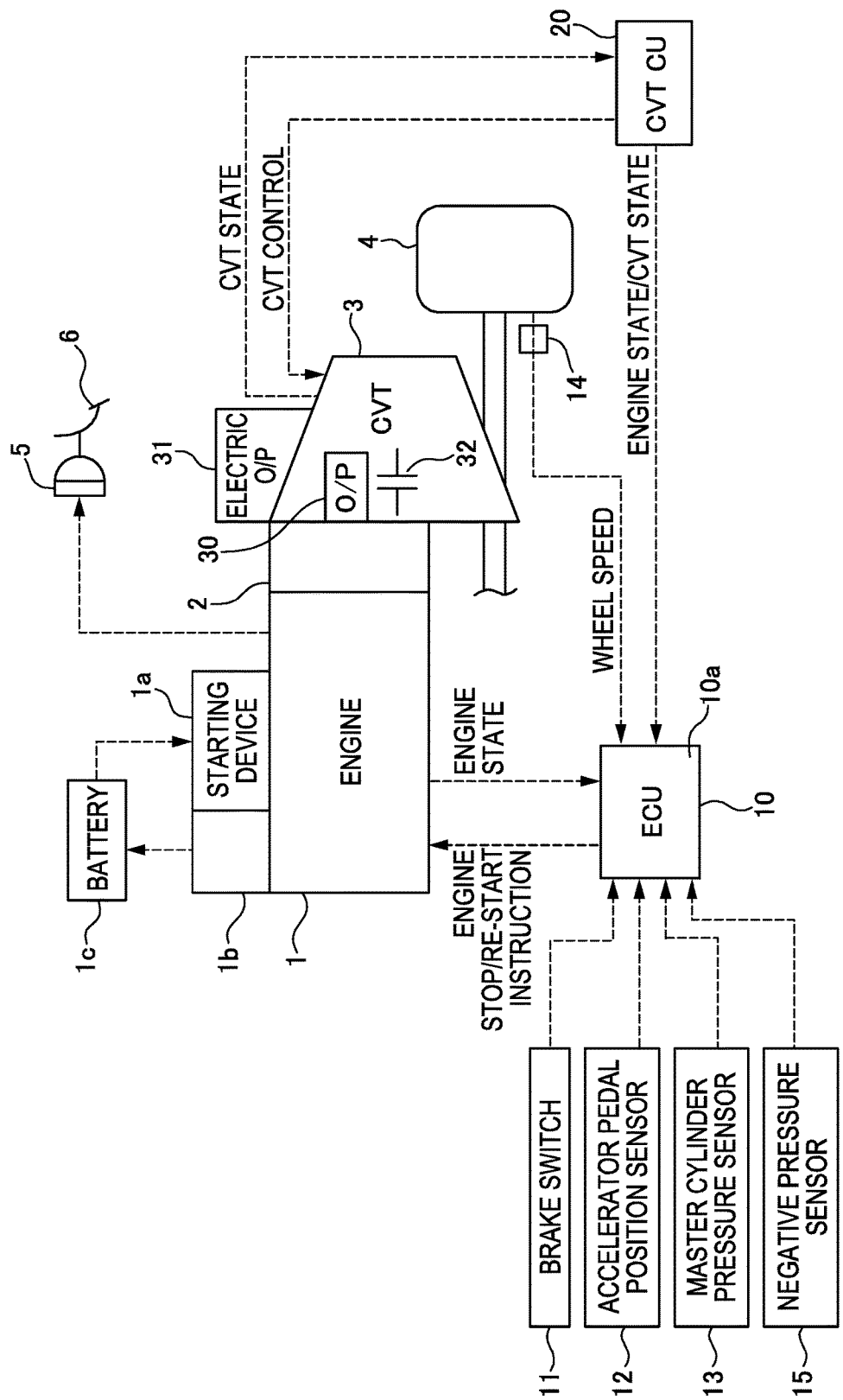
FIG. 1 is schematic diagram of a vehicle including a vehicle control device according to one or more embodiments of the present invention.

Embodiments of the present invention will be described below with reference to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIG. 1 is a schematic diagram of a vehicle including a vehicle control device according to one or more embodiments of the present invention. A torque converter 2 is provided on an output side of an engine 1 which is an internal combustion engine. A belt-type continuously variable transmission 3 is connected to an output side of the torque converter 2. A revolution driving force output from the engine 1 is input into the belt-type continuously variable transmission 3 through the torque converter 2 and shifted by a desired speed ratio and then, transmitted to a driving wheel 4.

A starter motor is provided in a starting device 1a. The starting device 1a carries out engine cranking by driving the starter motor by using power supplied from an onboard battery 1c on the basis of an engine start instruction. After the engine cranking, fuel is injected, and then, when the engine 1 is made capable of independent revolution, the starter motor is stopped.

An alternator 1b generates power by being rotated/driven by the engine 1 and supplies the generated power to the onboard battery 1c and the like.

The torque converter 2 carries out torque amplification at a low car speed. The torque converter 2 also has a lockup clutch and engages the lockup clutch at a predetermined car speed CSVSP1 (approximately 14 km/h, for example) or more and regulates relative rotation between an output shaft of the engine 1 and an input shaft of the belt-type continuously variable transmission 3.

The belt-type continuously variable transmission 3 is constituted by a clutch 32, a primary pulley and a secondary pulley, and a belt extended between these pulleys and achieves a desired speed ratio by changing a pulley groove width by hydraulic control. The clutch 32 connects/disconnects the engine 1 and the driving wheel 4.

Moreover, an oil pump 30 driven by the engine 1 is provided in the belt-type continuously variable transmission 3. When the engine is operating, a converter pressure of the torque converter 2 or a lockup clutch pressure is supplied by using this oil pump 30 as a hydraulic source, and a pulley pressure and a clutch engagement pressure of the belt-type continuously variable transmission 3 are supplied.

Furthermore, an electric oil pump 31 is provided separately from the oil pump 30 in the belt-type continuously variable transmission 3 (CVT), and it is so constituted that, if a hydraulic pressure cannot be supplied by the oil pump 30 due to an automatic stop of the engine, the electric oil pump 31 is operated and a required hydraulic pressure can be supplied to each of actuators. Thus, even when the engine is stopped, leakage of an operating oil can be compensated for, and a clutch engagement pressure can be maintained.

A master vac 5 is provided at an end of a brake pedal 6. This master vac 5 boosts a brake operating force by using an intake negative pressure of the engine 1.

The engine 1 has its engine operating state controlled by an engine control unit (ECU) (determining means, engine start control means, an accelerator-pedal position change-rate calculating means according to one or more embodiments of the present invention) 10. Into the engine control unit 10, a brake signal from a brake switch 11 outputting an on signal by a brake pedal operation by a driver, an accelerator signal (an accelerator pedal position signal) from an accelerator pedal position sensor (accelerator pedal position detecting means according to one or more embodiments of the present invention) 12 for detecting an accelerator pedal operation amount by the driver, a brake pedal operation amount signal (master cylinder pressure) from a master cylinder pressure sensor 13 for detecting a master cylinder pressure generated on the basis of the brake pedal operation amount, a wheel speed (having the same meaning as a car speed signal if the car speed is detected from the wheel speed) from a wheel speed sensor 14 provided at each wheel, a negative pressure signal from a negative pressure sensor 15 for detecting a negative pressure in the master vac 5, a CVT state signal from a CVT control unit (CVT CU) 20, and signals of an engine water temperature, a crank angle, an engine revolution speed and the like are input. The engine control unit 10 starts or automatically stops the engine 1 on the basis of the various signals.

The CVT control unit 20 transmits/receives signals of an engine operating state and a CVT state to/from the engine control unit 10 and controls a speed ratio and the like of the belt-type continuously variable transmission 3 on the basis of these signals. Specifically, when a traveling range is selected, the clutch 32 is engaged, a speed ratio is determined from a speed ratio map on the basis of the accelerator pedal position and a car speed, and each pulley pressure is controlled. Moreover, if the car speed is less than a predetermined car speed CSVSP1, the lock-up clutch is disengaged, but if the car speed is not less than the predetermined car speed CSVSP1, the lock-up clutch is engaged, and the engine 1 and the belt-type continuously variable transmission 3 are brought into a directly connected state. Furthermore, when the engine is automatically stopped while the traveling range is selected, the electric oil pump 31 is operated so as to ensure a required hydraulic pressure.

Subsequently, engine automatic stop control processing will be described. In the vehicle control device according to one or more embodiments of the present invention, in the case of accelerator-off, brake-off and the car speed at the predetermined car speed (50 km/h, for example) or more, the clutch 32 of the belt-type continuously variable transmission 3 is disengaged, the vehicle is brought into an inertia traveling state, and the engine 1 is stopped (fuel injection is stopped). As a result, fuel efficiency can be improved. The accelerator-off means a state where the accelerator pedal is not depressed, and the brake-off means a state where the brake pedal is not depressed.

Moreover, in the aforementioned inertia traveling state, if any one of the following conditions (a) to (c) is satisfied, the engine 1 is started (re-started):
 (a) The brake pedal is depressed by the driver;
 (b) The accelerator pedal is depressed by the driver: and
 (c) There is an engine start request other than the accelerator-on or the brake-on.

The engine 1 is started under the condition (a), that is, when the brake pedal is depressed by the driver for two reasons that a negative pressure of the brake is ensured, and a regenerative operation of the alternator 1b is carried out. The master vac 5 boosts the brake operating force by using the intake negative pressure of the engine 1, but if the brake operation amount is increased while the engine is stopped, the negative pressure by the engine revolution cannot be used if the engine stop is continued, and the engine 1 is started. Moreover, in a state where the clutch 32 of the belt-type continuously variable transmission 3 is disengaged, the regenerative operation of the alternator 1b cannot be carried out and thus, by starting the engine 1 so as to engage the clutch 32, the regenerative operation of the alternator 1b is carried out, and the fuel efficiency is improved.

The engine 1 is started under the condition (b), that is, when the accelerator pedal is depressed by the driver because an acceleration request by the driver is to be met.

The engine start request other than the accelerator-on or the brake-on under the condition (c) is an engine start request in order to drive a compressor of an air conditioning device or an engine start request for driving the alternator 1b for supplying power to an electric load, for example.

Figure 2:
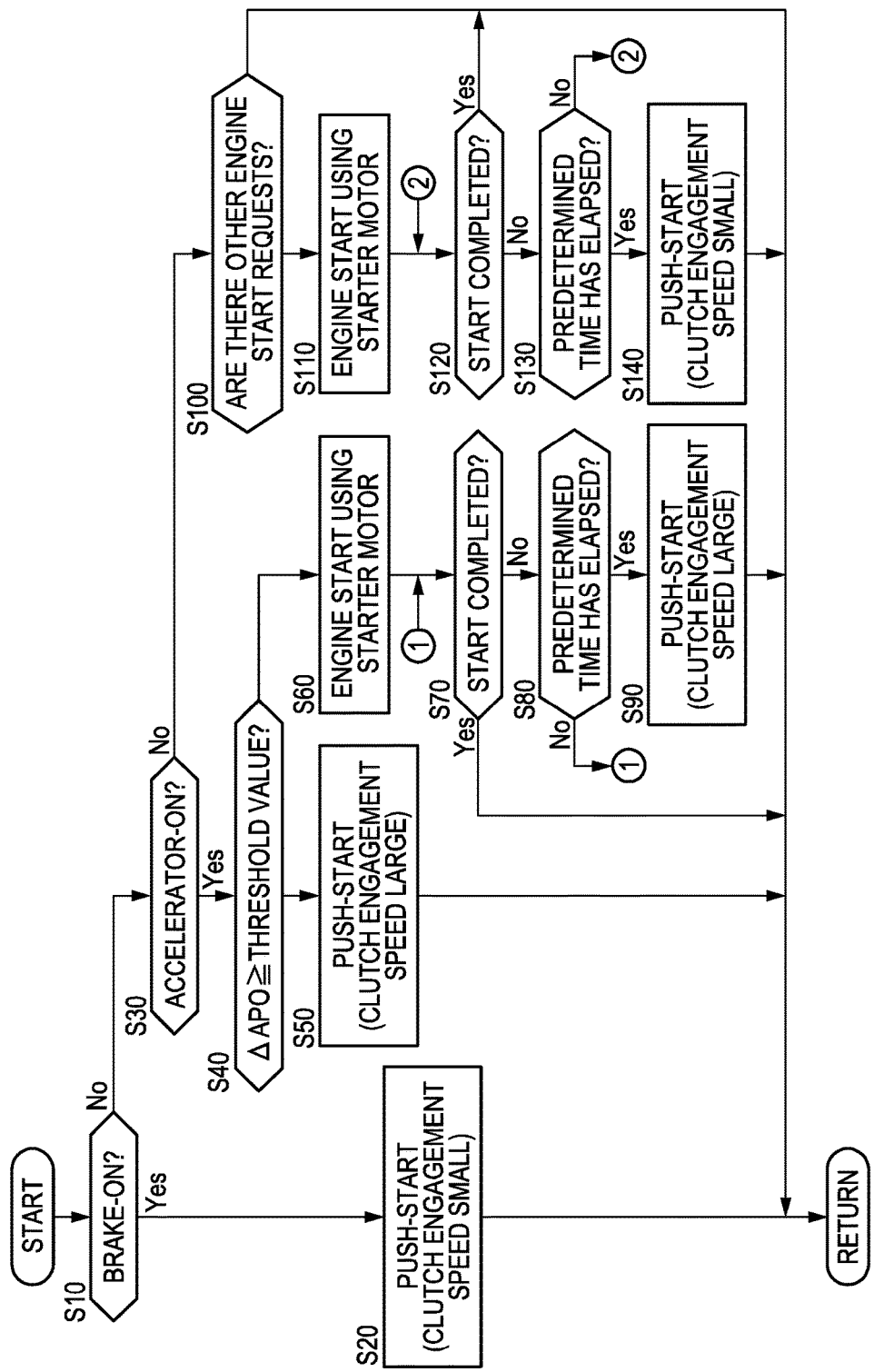
FIG. 2 is a flowchart illustrating control executed by the vehicle control device according to one or more embodiments of the present invention, and processing contents in which an engine is re-started from an inertia traveling state where the engine is stopped.

FIG. 2 is a flowchart illustrating control executed by the vehicle control device according to one or more embodiments of the present invention, and processing contents for re-starting the engine 1 from an inertia traveling state where the engine 1 is stopped. The engine control unit 10 starts processing at Step S10 per predetermined time in the inertia traveling in which the engine 1 is stopped.

At Step S10, it is determined whether or not the brake-off has been changed to brake-on. This determination is made on the basis of the brake signal input from the brake switch 11. When it is determined that the brake-off state has been changed to the brake-on, the routine proceeds to Step S20.

At Step S20, push-start is made by engaging the clutch 32 of the belt-type continuously variable transmission 3 and by transmitting power of the driving wheel 4 to the engine 1 so as to start the engine 1. Specifically, the engine control unit 10 issues an engagement instruction of the clutch 32 to the CVT control unit 20 and has fuel injected from a fuel injecting device, not shown.

Here, by engaging the clutch 32 in a vehicle traveling state, a shock occurs when the clutch is engaged. In a situation where the driver depresses the brake pedal, since there is no acceleration request, there is no need to start the engine 1 rapidly. Therefore, by slowing an engagement speed of the clutch 32, the shock at the clutch engagement is alleviated.

On the other hand, if it is determined at Step S10 that the brake-off has not been changed to the brake-on, the routine proceeds to Step S30. At Step S30, it is determined whether or not the accelerator-off has been changed to the accelerator-on. This determination is made on the basis of an accelerator signal input from the accelerator pedal position sensor 12. If it is determined that the accelerator-off has been changed to the accelerator-on, the routine proceeds to Step S40.

At Step S40, it is determined whether or not a temporal change rate $\Delta APO$ of an accelerator pedal position APO detected by the accelerator pedal position sensor 12 is at a predetermined threshold value or more. If it is determined that the temporal change rate $\Delta APO$ of the accelerator pedal position APO is at the predetermined threshold value or more, the routine proceeds to Step S50.

At Step S50, the push-start is made by engaging the clutch 32 of the belt-type continuously variable transmission 3 and by transmitting power of the driving wheel 4 to the engine 1 so as to start the engine 1. Specifically, the engine control unit 10 issues an engagement instruction of the clutch 32 to the CVT control unit 20 and has fuel injected from a fuel injecting device, not shown.

The case where the temporal change rate $\Delta APO$ of the accelerator pedal position APO is at the predetermined threshold value or more is a case where the driver rapidly depresses the accelerator pedal, which can be considered to be a situation where an acceleration request of the vehicle is large. Therefore, at Step S50, the engagement speed of the clutch 32 is quickened, and the engine 1 is started rapidly. When the accelerator pedal is depressed rapidly, a shock allowance of the driver is large and thus, even if the clutch engagement speed is made faster and the clutch engagement shock occurs, the driver is considered not to feel a discomfort very much. It is to be noted that the clutch engagement speed at the push-start at Step S20 is slower than the clutch engagement speed at the push-start at Step S50.

On the other hand, if it is determined that the temporal change rate ΔAPO of the accelerator pedal position APO at Step S40 is less than the predetermined threshold value, the routine proceeds to Step S60. At Step S60, the engine 1 is started by driving the starter motor of the starting device 1a.

If the temporal change rate ΔAPO of the accelerator pedal position APO is less than the predetermined threshold value, since it is not time when the accelerator pedal should be depressed rapidly, the shock allowance of the driver is not large. Therefore, similarly to the processing at Step S20, the push-start can be made by engaging the clutch 32 at a slower engagement speed, but the engine 1 is started by using the starter motor in order to ensure an acceleration response of the vehicle.

At Step S70, it is determined whether the start of the engine 1 has been completed or not. Here, when an engine revolution speed becomes a predetermined revolution capable of independent revolution or more, it is determined that the start of the engine 1 is completed. If it is determined that the start of the engine 1 is completed, processing of the flowchart is finished, while if it is determined that the start of the engine 1 is not completed, the routine proceeds to Step S80.

At Step S80, it is determined whether predetermined time has elapsed since the start of start processing of the engine 1 at Step S60. If it is determined that the predetermined time has not elapsed, the routine returns to Step S70, while if it is determined that the predetermined time has elapsed, the routine proceeds to Step S90.

At Step S90, similarly to Step S50, the push-start for starting the engine 1 is made by engaging the clutch 32 of the belt-type continuously variable transmission 3 at a fast clutch engagement speed and by transmitting power of the driving wheel 4 to the engine 1. The engagement speed of the clutch 32 is made faster because there is a vehicle acceleration request.

If it is determined that the accelerator-off has not been changed to the accelerator-on at Step S30, the routine proceeds to Step S100. At Step S100, it is determined whether or not the aforementioned condition (c) has been met, that is, whether or not there is an engine start request other than the accelerator-on or the brake-on. If it is determined that there is an engine start request other than the accelerator-on or the brake-on, the routine proceeds to Step S110, while if it is determined that there is no engine start request other than the accelerator-on or the brake-on, the processing of the flowchart is finished, and the inertia traveling state where the engine 1 is stopped is continued.

At Step S110, the engine 1 is started by driving the starter motor of the starting device 1a.

At Step S120, it is determined whether or not the start of the engine 1 has been completed. This determination is the same as the determination at Step S70. If it is determined that the start of the engine 1 has been completed, the processing of the flowchart is finished, while if it is determined that the start of the engine 1 has not been completed, the routine proceeds to Step S130.

At Step S130, it is determined whether or not the predetermined time has elapsed since the start of the start processing of the engine 1 at Step S110. If it is determined that the predetermined time has not elapsed, the routine returns to Step S120, while if it is determined that the predetermined time has elapsed, the routine proceeds to Step S140.

At Step S140, similarly to Step S20, the push-start for starting the engine 1 is made by engaging the clutch 32 of the belt-type continuously variable transmission 3 at a slow clutch engagement speed and by transmitting the power of the driving wheel 4 to the engine 1. The engagement speed of the clutch 32 is made slower because there is no vehicle acceleration request and there is no need to start the engine 1 rapidly and thus, the engagement speed of the clutch 32 is made slower so as to alleviate a shock at clutch engagement.

As described above, the vehicle control device according to one or more embodiments of the present invention disengages the clutch 32 provided between the engine 1 and the driving wheel 4 at the brake-off and the accelerator-off during traveling of the vehicle, and in the vehicle control device having a function of stopping the engine 1 and of carrying out inertia traveling, it is determined whether or not the brake pedal has been depressed, and if it is determined that the brake pedal has been depressed during the inertia traveling, the engine 1 is started by the push-start by engaging the clutch 32 and by transmitting the power of the driving wheel 4 to the engine 1. In the situation where the driver depresses the brake pedal, since there is no acceleration request, there is no need to start the engine 1 rapidly but the start of the engine 1 can take time. Therefore, by slowing the engagement speed at the clutch engagement so as to alleviate the shock at the clutch engagement, the engine 1 can be started by the push-start by the clutch engagement while deterioration of drivability is suppressed. Moreover, since the number of engine start times using the starter motor can be reduced, durability of the starter motor can be improved.

Moreover, during the inertia traveling, if the temporal change rate ΔAPO of the accelerator pedal position rises to the predetermined threshold value or more, the engine 1 is started by the push-start by engaging the clutch 32 and by transmitting the power of the driving wheel 4 to the engine 1. If the temporal change rate ΔAPO of the accelerator pedal position APO is at the predetermined threshold value or more, that is, if the driver depresses the accelerator pedal rapidly, since the shock allowance of the driver is large, drivability is not lost even if the clutch engagement shock occurs. As a result, the engine 1 can be started by the push-start by the clutch engagement while deterioration of the drivability is suppressed.

Moreover, when the engine 1 is to be started by the push-start, the engagement speed of the clutch 32 when it is determined that the brake pedal has been depressed is made slower than the engagement speed of the clutch 32 when the temporal change rate ΔAPO of the accelerator pedal position is at the predetermined threshold value or more. In a situation where the driver depresses the brake pedal, since there is no acceleration request, by slowing the engagement speed at the clutch engagement so as to alleviate the shock at the clutch engagement, deterioration of drivability can be suppressed. On the other hand, if the temporal change rate ΔAPO of the accelerator pedal position is at the predetermined threshold value or more, the acceleration request of the vehicle can be met by quickening the engagement speed of the clutch 32 and by starting the engine 1 rapidly.

During the inertia traveling, if the accelerator pedal position is larger than 0 and if the temporal change rate ΔAPO of the accelerator pedal position is less than the predetermined threshold value, the engine 1 is started by using the starter motor, and if the start of the engine 1 is not completed within predetermined time since the engine start using the starter motor is started, the engine 1 is started by the push-start by engaging the clutch 32 and by transmitting the power of the driving wheel 4 to the engine 1. As a result, even if the engine start cannot be started by the starter motor since sufficient power cannot be supplied to the starter motor due to deterioration of the battery 1c or the like, for example, the engine can be started by the push-start, and drastic deterioration of an acceleration response can be prevented.

During the inertia traveling, if there is a start request of the engine 1 though the brake-off and the accelerator-off state is maintained, the engine 1 is started by using the starter motor, and if the start of the engine 1 is not completed within predetermined time since the engine start by using the starter motor is started, the engine 1 is started by the push-start by engaging the clutch 32 and by transmitting the power of the driving wheel 4 to the engine 1. As a result, even if the engine cannot be started by the starter motor since sufficient power cannot be supplied to the starter motor due to deterioration of the battery 1c or the like, for example, the engine can be started by the push-start, and the acceleration request of the engine 1 can be satisfied.

Embodiments of the present invention are described above, but the aforementioned embodiments illustrate only examples of the present invention, and are not intended to limit a technical range of the present invention to the specific constitution of the aforementioned embodiments. For example, at Step S60 and Step S110 in FIG. 2, it is described that the engine 1 is started by driving the starter motor, but the engine 1 may be started by driving the alternator 1b as a motor for start instead of the starter motor.

In one or more of the aforementioned embodiments, the example in which the belt-type continuously variable transmission 3 is employed is illustrated, but it may be constitution including an automatic transmission with steps or a manual transmission.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A vehicle control device, comprising:
an accelerator pedal position detector configured to detect an accelerator pedal position; and
an engine controller,
wherein the vehicle control device, to carry out inertia traveling, disengages a clutch provided in an automatic transmission when brake-off and accelerator-off are brought about during traveling of a vehicle, and stops an engine,
wherein the engine controller is configured to determine, as a determination result, whether or not a brake pedal has been depressed,
wherein the engine controller is configured to select between performing a push-start to start the engine and employing a starter motor to start the engine based on the determination result and the accelerator pedal position during the inertia traveling,
wherein the push-start engages the clutch and transmits power of a driving wheel to the engine,
wherein the engine controller is configured to calculate temporal change rate of the accelerator pedal position,
wherein the engine controller starts the engine by the push-start by engaging the clutch and by transmitting the power of the driving wheel to the engine if the temporal change rate of the accelerator pedal position becomes a predetermined threshold value or more during the inertia traveling, and
wherein, when the engine is to be started by the push-start, the engine controller makes an engagement speed of the clutch when the engine controller determines that the brake pedal has been depressed slower than the engagement speed of the clutch when the temporal change rate of the accelerator pedal position is at the predetermined threshold value or more.

2. The vehicle control device according to claim 1, wherein the engine controller starts the engine by using the starter motor if the accelerator pedal position is larger than 0 and the temporal change rate of the accelerator pedal position is less than the threshold value during the inertial traveling, and starts the engine by push-start by engaging the clutch and by transmitting the power of the driving wheel to the engine if start of the engine is not completed within predetermined time since the engine start using the starter motor is started.

3. The vehicle control device according to claim 1, wherein the engine controller starts the engine by using a starter motor if there is a start request of the engine though a state of brake-off and accelerator-off are maintained during the inertia traveling, and starts the engine by the push-start by engaging the clutch and by transmitting the power of the driving wheel to the engine if the start of the engine is not completed within predetermined time since the engine start using the starter motor is started.

4. The vehicle control device of claim 1, wherein the automatic transmission is a belt-type continuously variable transmission.

5. A vehicle control method comprising:
carrying out inertia traveling by disengaging a clutch provided in an automatic transmission when brake-off and accelerator-off are brought about during traveling of a vehicle, and stopping an engine;
determining, as a determination result, whether or not a brake pedal has been depressed;
detecting an accelerator pedal position;
selecting between performing a push-start to start the engine and employing a starter motor to start the engine based on the determination result and the accelerator pedal position during the inertia traveling
calculating temporal change rate of the accelerator pedal position; and
starting the engine by the push-start by engaging the clutch and by transmitting the power of the driving wheel to the engine if the temporal change rate of the accelerator pedal position becomes a predetermined threshold value or more during the inertia traveling,
wherein the push-start engages the clutch and transmits power of the driving wheel to the engine, and
wherein, when the engine is to be started by the push-start, making an engagement speed of the clutch when the engine controller determines that the brake pedal has been depressed slower than the engagement speed of the clutch when the temporal change rate of the accelerator pedal position is at the predetermined threshold value or more.

6. The vehicle control device of claim 5, wherein the automatic transmission is a belt-type continuously variable transmission.

* * * * *